United States Patent
Patrick et al.

(10) Patent No.: US 8,396,719 B2
(45) Date of Patent: *Mar. 12, 2013

(54) REAL-TIME CUSTOMER SERVICE ASSISTANCE USING COLLECTED CUSTOMER LIFE CYCLE DATA

(75) Inventors: Edward Patrick, Toronto (CA); Nehemia Zucker, Encino, CA (US); James Mason, Sherman Oaks, CA (US)

(73) Assignee: j2 Global Communications, Hollywood, CA (US)

(*) Notice: Subject to any disclaimer, the term of this patent is extended or adjusted under 35 U.S.C. 154(b) by 337 days.

This patent is subject to a terminal disclaimer.

(21) Appl. No.: 12/768,526

(22) Filed: Apr. 27, 2010

(65) Prior Publication Data

US 2010/0205103 A1    Aug. 12, 2010

Related U.S. Application Data

(63) Continuation of application No. 11/089,718, filed on Mar. 25, 2005, now Pat. No. 7,720,690.

(51) Int. Cl.
  *G06Q 10/00*    (2012.01)
(52) U.S. Cl. ............ 705/1.1; 705/14.53; 705/304
(58) Field of Classification Search ................ 705/1.1
  See application file for complete search history.

(56) References Cited

U.S. PATENT DOCUMENTS

| | | | |
|---|---|---|---|
| 6,549,612 B2 | 4/2003 | Gifford et al. |
| 7,222,075 B2 | 5/2007 | Petrushin |
| 7,379,895 B1 | 5/2008 | Meek et al. |
| 2001/0054064 A1 | 12/2001 | Kannan |
| 2002/0055876 A1 | 5/2002 | Gabler |
| 2002/0130904 A1 | 9/2002 | Becker et al. |
| 2003/0177017 A1 | 9/2003 | Boyer et al. |
| 2004/0082839 A1 | 4/2004 | Haugen |
| 2004/0225499 A1 | 11/2004 | Wang et al. |
| 2004/0249650 A1 | 12/2004 | Freedman et al. |
| 2005/0131944 A1 | 6/2005 | Patrick et al. |

OTHER PUBLICATIONS

PCT International Search Report (dated Aug. 10, 2007), International Application No. PCT/US 06/08259, International Filing Date Mar. 7, 2006, (10 pages).
PCT International Preliminary Report on Patentability (IPRP), dated Oct. 4, 2007, International Application No. PCT/US2006/008259—International Filing Date Mar. 7, 2006, (6 pages).
Non-Final Office Action (dated Apr. 27, 2009), U.S. Appl. No. 11/089,718, filed Mar. 25, 2005, First Named Inventor: Edward Patrick, (25 pages).
Non-Final Office Action (dated Apr. 15, 2008), U.S. Appl. No. 11/089,718, filed Mar. 25, 2005, First Named Inventor: Edward Patrick, (25 pages).
Non-Final Office Action (dated Oct. 24, 2008), U.S. Appl. No. 11/089,718, filed Mar. 25, 2005, First Named Inventor: Edward Patrick, (21 pages).

*Primary Examiner* — Candice D Wilson
(74) *Attorney, Agent, or Firm* — Blakely Sokoloff Taylor & Zafman LLP

(57) ABSTRACT

A computer-implemented method is performed during a single communication session between a customer service representative (CSR) of a merchant, and the merchant's customer. The conversation between the CSR and the customer is analyzed to determine an issue. Previously collected information about the customer is accessed, from a database that stores information about customers of the merchant. A tip is determined and sent to be displayed to the CSR. The tip is determined based on the mood and the accessed previously collected information. Other embodiments are also described and claimed.

16 Claims, 3 Drawing Sheets

REAL-TIME CUSTOMER SERVICE ASSISTANCE USING COLLECTED CUSTOMER LIFE CYCLE DATA

RELATED MATTERS

This application is a continuation of pending U.S. application Ser. No. 11/089,718, filed Mar. 25, 2005, entitled "Real-Time Customer Service Assistance Using Collected Customer Life Cycle Data", currently pending.

BACKGROUND

An embodiment of the invention is directed to providing real-time customer service assistance during an online chat session to the customer service representative, using collected customer life cycle data. Other embodiments are also described and claimed.

Providing superior customer service assistance is one of the most important factors in a successful business. For example, when a customer calls a merchant asking for help with a product or service provided by the merchant, the conversation between the customer and the customer service representative (CSR) may be monitored for training and coaching purposes. This technique is used to help train CSRs so that they can listen better to the customer and resolve the customer's issue in a more expedient manner. Some merchants with online presence have deployed online chat capability for customers to discuss their issues with CSRs.

BRIEF DESCRIPTION OF THE DRAWINGS

The embodiments of the invention are illustrated by way of example and not by way of limitation in the figures of the accompanying drawings in which like references indicate similar elements. It should be noted that references to "an" embodiment of the invention in this disclosure are not necessarily to the same embodiment, and they mean at least one.

DETAILED DESCRIPTION

Figure 1:
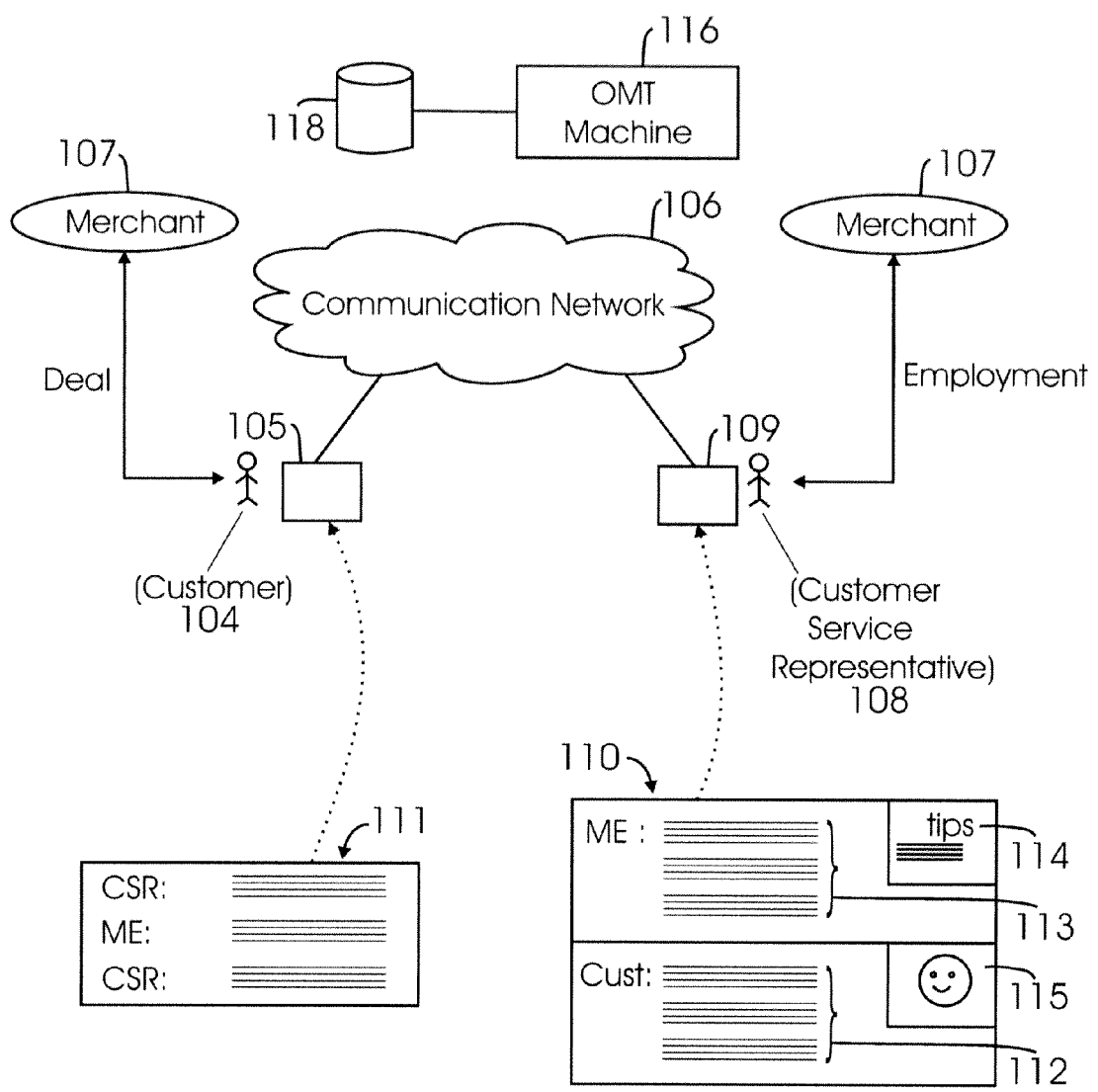
FIG. 1 is a block diagram of the overall environment in which customer service may be improved.

Beginning with FIG. 1, an online environment for improved customer service assistance is shown. In this case, client machines 105 and 109 are communicatively coupled to each other as nodes of a communication network 106 (e.g., a packet-switched, internetwork). The machine 105 may be a desktop, laptop, or other type of personal computing device used by a customer 104. The machine 109 in most cases would be a desktop computer used by a customer service representative (CSR) 108. Software running in these respective machines may support user interfaces 111, 110 on their respective display screens. The software may support an online chat session protocol such as Instant Messaging, in which conversational text between the customer 104 and the CSR 108 is displayed. Note that the chat session may be of the type where each character is sent as it is typed, without waiting for a carriage return. Alternatively, the chat session may be of the type where no character is sent until a carriage return has been pressed by the sender. The conversational text may have two parts, a customer portion 112 that has been entered into the machine 105 by the customer 104, and a merchant portion 113 that has been entered into the machine 109 by the CSR 108. This conversational text may reflect, for example, the customer asking technical support or billing questions in relation to a product or service of the merchant for which there is a deal with the customer. The CSR 108 may be an employee of the merchant 107.

The conversational text may be monitored in real-time, i.e. as it is occurring for the first time, by an online marketing tool (OMT) machine 116 that is communicatively coupled to the machine 109. Previously collected information about the customer 105 and other customers of the merchant 107 may be stored in a database 118 accessible by OMT software that may be running on the machine 116. The machine 116 and/or the OMT software may be administered by the merchant 107, or by a third party. As an example, the merchant 107 may be j2 Global Communications, Inc. of Hollywood, Calif. whose services are described below.

The computer implemented method in the environment of FIG. 1 would perform several operations during the online chat session, between the CSR and the customer. First, conversational text of the chat session would be analyzed, to determine a mood of the customer. Such analysis may be performed as suggested above by OMT software running in the OMT Machine 116. Alternatively, the OMT software may be running on the machine 109 of the CSR 108.

A tip is determined and sent to be displayed to the CSR 108, for example within a tip display area 114 or 115 of the user interface 110. According to an embodiment of the invention, this tip is determined based on the determined mood of the customer 104, and previously collected information about the customer that has been accessed from the database 118. The tip is designed to allow the CSR 108 to better communicate with the customer 104. For example, the tip may include text (area 114) that describes a resolution to the customer's problem being discussed in the conversational text. As an alternative, or in addition, the tip may include a symbol (such as a happy or sad face) in area 115 that reflects the OMT software's determination of the mood of the customer 104. This generated tip thus provides real-time customer service assistance, using collected customer "life cycle data" which refers to information that has been collected about one or more customers of the merchant over a period of time including the period during which the customer has been with the merchant. This information would reveal, for example, how deals between the customer and the merchant, and the behavior of the customer 104 with respect to the merchant, have evolved over some time. For example, the collected information could indicate how often a customer has complained about a particular problem. The ability to access such information in real-time from database 118, and make a determination as to the tip during the actual discussion between the customer and the CSR 108, is particularly beneficial since it can use information that the CSR would not be expected to remember. For example, the CSR may be a relatively new telemarketing salesperson and likely will not know all of the relevant history of the particular customer 104. Regardless of such inexperience or lack of knowledge, the CSR should be able to resolve the issue raised in the discussion, or make an offer to the customer for upgrading her service plan, based directly on the tip that has been automatically provided to her in real-time.

The previously collected information may include data points indicating the history of all marketing communications directed to one or more customers of the merchant (e.g., email campaigns; advertisements on the merchant's web site) and reactions of the customers. For example, the collected data points could indicate if a customer received a marketing email, and whether she opened the email and clicked on a link to upgrade her account with the merchant. The collected data could also indicate that the customer then continued the process of upgrade until a particular demographic question was asked, at which point the customer balked.

In addition to marketing communications activity, customer usage patterns may be logged (e.g., when and what type of the merchant's services were used). The collected information may also include the results of pattern analysis, or analysis that leads to relationships being found between datapoints. This may involve the application of relatively complex "rules" that cannot be analyzed in real-time due to computing machine limitations. Such compute-intensive analysis would be done periodically "off-line", i.e. not tied to a particular customer—CSR session, to generate and update fast look-up tables that express the "state" of the customer for some aspect of his behavior (see the description below for FIG. 3). Note that a rule may refer to not just the properties of one or more customers, but also to properties of their respective accounts and/or historical data regarding marketing communications and reactions.

Figure 2:
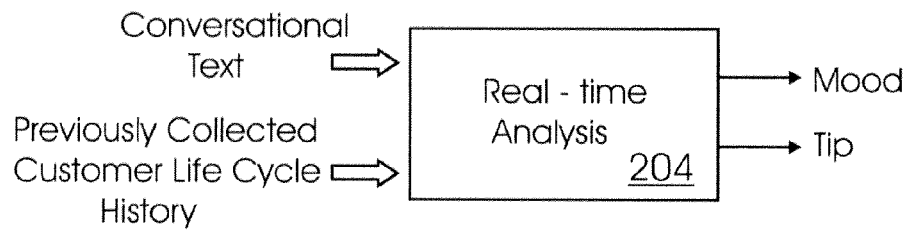
FIG. 2 shows a block diagram of a real-time analysis tool that may be used to provide improved customer service assistance.

Turning now to FIG. 2, a block diagram of a real-time analysis tool 204 is shown which may be used to make the mood and tip determinations mentioned above. Input to the analysis tool 204 may include the conversational text that is obtained in real-time, including the customer portion 112 and the merchant portion 113. In addition, previously collected customer life cycle history obtained from the database 118 may also be an input. The analysis tool 204 may analyze the conversational text by, for example, detecting a change in typing rate of the customer. This may be a change in the rate at which certain characters and words are typed. The rate change may also be determined based on how often sentences or paragraphs are completed (e.g., detecting the rate at which the carriage return is pressed on the keyboard or a mouse button is clicked). The amount of typing by the customer may also be detected where for instance a greater number of words being typed may suggest that the customer is irritated. Lexical analysis may also be provided, to search for certain language, such as certain words and grammar used by the customer, for example, the loss of correct of correct grammar as one becomes more angry or agitated.

The analysis tool 204 may analyze the previously collected customer life cycle information which is knowledge about the customer that the CSR may not be reasonably expected to know. For example, the life cycle history may reveal that this particular customer has been a paying customer for over two years, but has been receiving a particular error message when running a merchant provided application for the last few weeks. The analysis tool 1204 may conclude that the customer has been prevented from being able to properly use the merchant's product or service for which she is paying the merchant. The life cycle history may also include the customer's history of payments made to the merchant, as well as a length of time the customer has been a paying subscriber, as opposed to a free subscriber to some of the merchant's services. The analysis tool 204 may also infer that this customer is, in fact, having a relatively long standing problem with the merchant's services. If that information is then combined with the, for example, higher rate of typing that is detected, then the system may conclude that the customer is likely angry. The tip may be generated accordingly, to include, for example, a particular driver or patch to be loaded to fix the error message, as well as compensate this customer with a certain number of days of service or a certain type of complementary service. The range of possible tips from which the analysis tool 204 may select one or more to display to the CSR may be defined by the application of predefined business rules.

Figure 3:
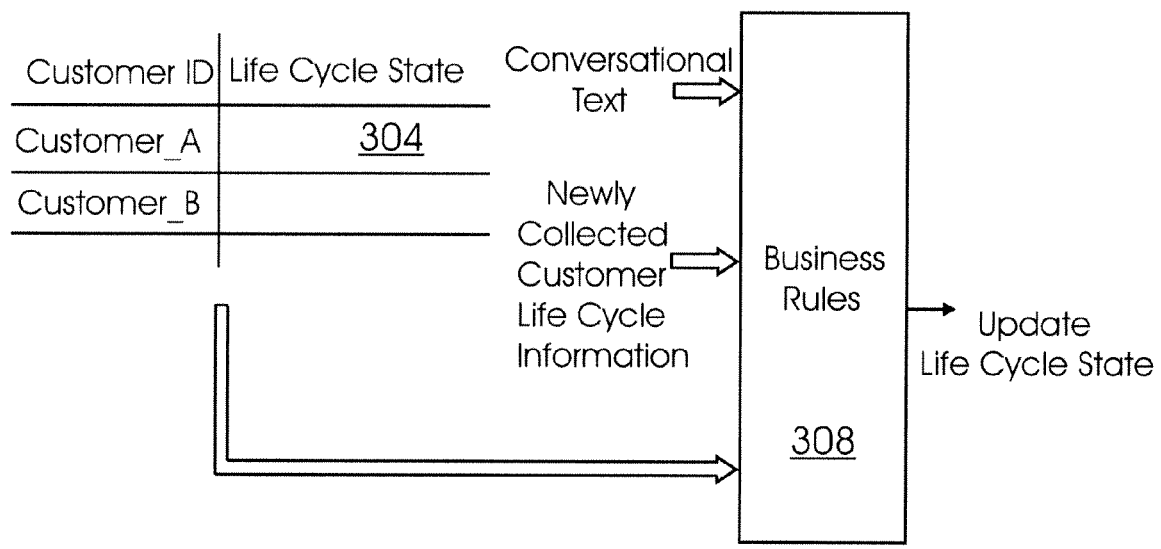
FIG. 3 is a block diagram showing a business rules engine used to update the life cycle state of the customers of a merchant, based on several inputs.

In FIG. 3, a business rules engine 308 is depicted that may be used to provide the possible tips for each customer. The business rules engine 308 may be designed to maintain, for each customer of the merchant, a respective state variable. This variable indicates one of a number of predetermined, behavioral states of that customer. The state variable is updated during the customer's life cycle, that is the time spent as a customer of the merchant, as new information is collected and stored about the customer. The state variable of a customer is updated to a "next" state, based on an analysis of the conversational text and an application of a predefined business rule for transitioning between a current life cycle state and a next life cycle state. The current life cycle state 304 may be accessed from storage, using, for example, a customer identification as the index, as shown in FIG. 3. Additional aspects of the business rules engine 308, including techniques for updating the life cycle states of the customers of the merchant, are given in co-assigned U.S. patent application Ser. No. 10/737,072.

Figure 4:
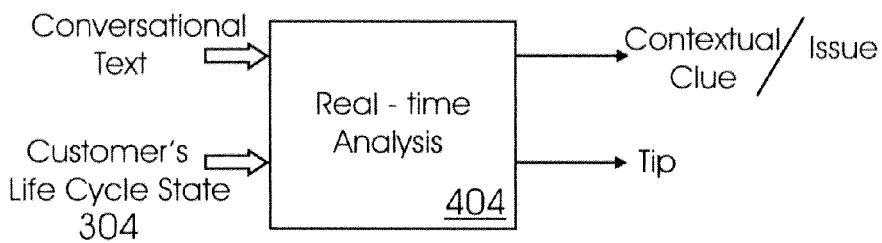
FIG. 4 is a block diagram of another real-time analysis tool that generates tips for the customer service representative, based on several inputs.

As suggested above, a real-time analysis tool 404 may be devised that analyses not just the conversational text of an online chat session between a customer and a merchant CSR, but also takes advantage of the availability of this particular customer's life cycle state 304 (see FIG. 4). Such a real-time analysis tool 404 determines a tip that may be displayed to the CSR in real-time, where this tip is determined based on a determined contextual clue inferred from the conversational text, plus the current value of the customer's life cycle state 304. The contextual clue allows the system to better understand this particular customer and/or his frame of mind, during the chat session. Contextual clues may be determined used the speech processing techniques described above, where detections of certain speech patterns can be based on the system having previously learned speech patterns of this particular customer. In contrast, it should be noted that speech recognition may not be practical given the current available computing power, because of the need to determine the tips in real-time, that is during the chat session. With increased computing power, however, speech recognition techniques may be practical to use in determining the contextual clue and the tips in real-time.

The above-described online environment for improved customer service assistance may be implemented for unified communications services, such as those provided by j2 Global Communications, Inc., of Hollywood, Calif. The merchant services in that case may include transferring a fax or voice message, that has been sent to the customer 105 at an inbound address assigned to the customer, to an electronic in-box of the customer. This inbound address may be a telephone number, and the in-box may be an email storage box administered not by the merchant but by a third party under a separate agreement with the customer. The methodology described here is also applicable to other types of services, including, for example, the transfer of an outbound fax or voice message, that has been sent by the customer. The message is sent by the customer to a network of the merchant, and in particular to an outbound address. The outbound address may be an email address of the merchant used for receiving email messages, from customers of the merchant. Such email messages could include the outbound fax or voice messages in the form of an attachment, for example. The merchant network then transfers this message to a destination address of a person who has been selected by the customer to receive the outbound message. The destination address may be a telephone number of a recipient.

An embodiment of the invention may be a machine-readable medium having stored thereon instructions which program a processor to perform the operations described above. In other embodiments, some of these operations might be performed by specific hardware components that contain hardwired logic. Those operations might alternatively be performed by any combination of programmed computer components and custom hardware components.

A machine-readable medium may include any mechanism for storing or transmitting information in a form readable by a machine (e.g., a computer; a network of computers), not limited to Compact Disc Read-Only Memory (CD-ROMs), Read-Only Memory (ROMs), Random Access Memory (RAM), Erasable Programmable Read-Only Memory (EPROM), and a transmission over the Internet.

Figure 5:
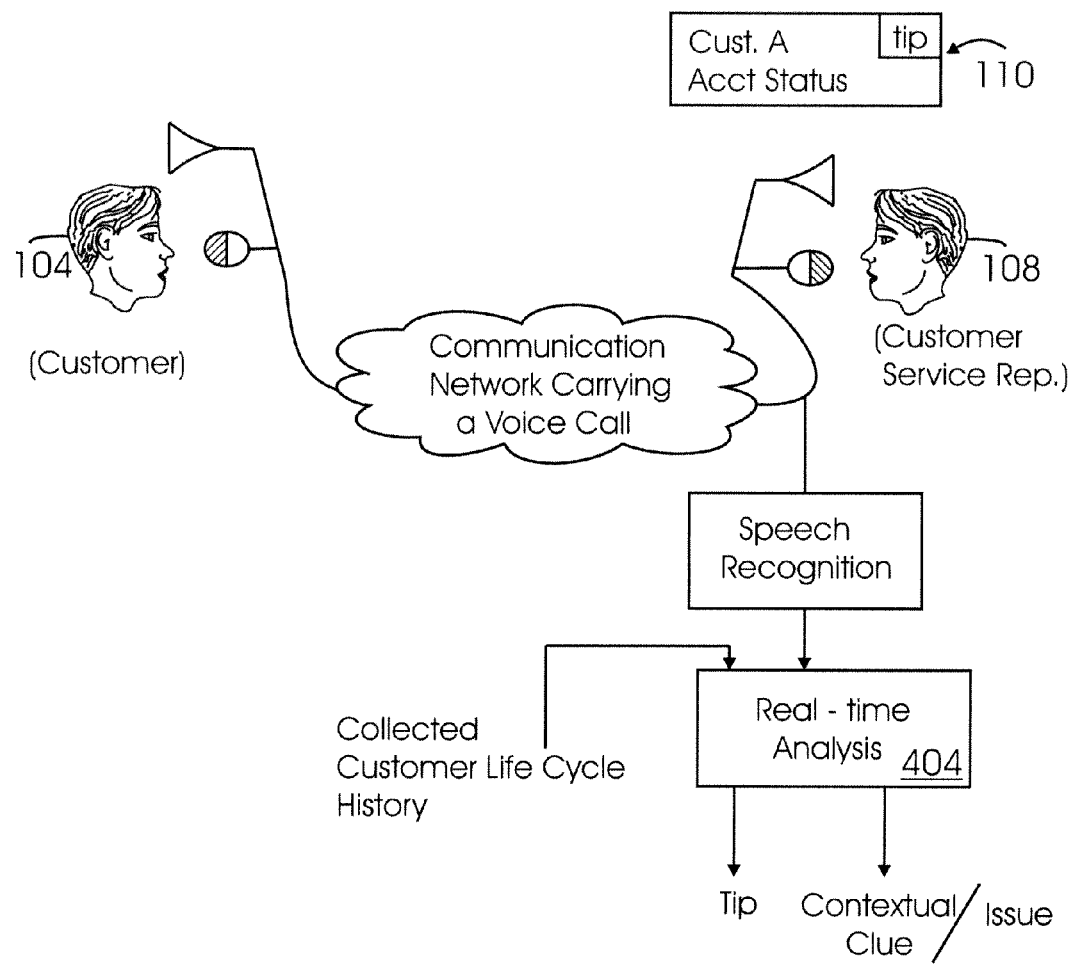
FIG. 5 illustrates another environment for improving customer service assistance.

The invention is not limited to the specific embodiments described above. For example, the computer-implemented methods described above may be more generally applied to a single communication session between the CSR and the customer. In that case, the conversation between the CSR and the merchant can be during a voice call, as illustrated in FIG. 5, such that speech recognition techniques would need to be used to extract the conversational text. Accordingly, other embodiments are within the scope of the claims.

What is claimed is:

1. A computer-implemented method comprising:
performing a)-c) during a single communication session between a customer service representative (CSR) of a service merchant and the merchant's customer, by a) analyzing conversation between the CSR and the customer to determine an issue;
b) accessing previously collected information about the customer from a database that stores information about a plurality of customers of the merchant, the accessed previously collected information includes a history of marketing communications made to the customer and the customer's reactions to the marketing communications; and
c) determining and sending a tip to be displayed to the CSR, the tip having been determined based on the determined issue and the accessed previously collected information.

2. The method of claim 1 wherein the conversation is analyzed by detecting a change in a time gap in the customer's speech.

3. The method of claim 1 wherein the conversation is analyzed by detecting a change in a rate of the customer's speech.

4. The method of claim 1 wherein the conversation is analyzed by detecting a change in volume of the customer's speech.

5. The method of claim 1 wherein the accessed previously collected information further includes notes associated with the customer because of previous communications with a CSR, properties including age and gender of the customer, and account status including one of active, suspended and canceled.

6. The method of claim 1 wherein the accessed previously collected information further includes patterns of usage by the customer of services offered by the merchant, and results of analysis that has been performed off-line upon data points taken from said history and said usage patterns.

7. The method of claim 1 wherein the results have been computed off-line and then stored in the form of a look-up table that is accessed during the communication session.

8. The method of claim 1 wherein the look-up table gives a next state value for the customer based on a current state value for the customer and based on a set of rules being applied to the current state value, the set of rules defining how a customer transitions from one state to another based on customer life cycle data that is collected for the merchant's customers.

9. A computer-implemented method comprising:
performing a)-c) by a computer system, during an on-line chat session performed over the Internet between a customer service representative (CSR) of a merchant and a merchant's customer, by a) analyzing conversational text of the on-line chat session to determine an issue;
b) accessing previously collected information about the customer from a database that stores information about a plurality of customers of the merchant, the previously collected information includes a history of marketing communications made to the customer and the customer's reaction to the marketing communications; and
c) determining and sending a tip to be displayed to the CSR, the tip having been determined based on the determined issue and the accessed previously collected information.

10. The method of claim 9 wherein the accessed previously collected information includes a list of different types of service offers from the merchant.

11. The method of claim 9 wherein the previously collected information about the customer further includes one of the customer's history of payments made to the merchant, and the length of time the customer has been a paying subscriber as opposed to a free subscriber to the merchant's service.

12. A computer system comprising:
a processor and a machine-readable medium having stored therein instructions that include a real-time analysis tool, that is to be executed by the processor to initialize, for each of a plurality of customers of a merchant, a respective state variable that indicates one of a plurality of predetermined behavioral states of the customer, wherein the analysis tool automatically updates the state variable during a customer's life cycle as new information is collected about the customer and stored in a database that stores information about the plurality of customers, the stored information includes a history of marketing communications made to each customer and each customer's reaction to the marketing communications,
wherein the analysis tool when executed by the processor is to, during an on-line chat session over the Internet between a customer service representative (CSR) of the merchant and the merchant's customer, a) analyze conversational text of the on-line chat session to determine a contextual clue, and b) determine and send a tip to be displayed to the CSR, the tip having been determined based on the determined clue and based on a current value of the customer's state variable.

13. The computer system of claim 12 wherein the analysis tool is to update the state variable of the customer to a next state based on an analysis of the conversational text and based on an application of a predefined rule for transitioning a customer between states.

14. A computer system comprising:
a processor and a machine-readable medium having stored therein instructions that include a real-time analysis tool, that is to be executed by the processor to analyze conversational text of an on-line chat session being performed over the Internet between a customer service representative (CSR) of a merchant and a merchant's customer to determine an issue concerning the customer; and a database that stores previously collected information about a plurality of customers of the merchant, the previously collected information includes a history of marketing communications made to the customer and the customer's reaction, to the marketing communications, the real-time analysis tool to access the previously collected information about the customer from the database, and determine and send a tip to be displayed to the CSR during the chat session, the tip having been determined based on the determined issue and the accessed previously collected information.

15. The computer system of claim 14 wherein the accessed previously collected information includes a list of different types of service offers from the merchant.

16. The computer system of claim 14 wherein the previously collected information about the customer further comprises one of the customer's history of payments made to the merchant, and the length of time the customer has been a paying subscriber as opposed to a free subscriber to the merchant's service.

* * * * *